(12) United States Patent
Izdebski et al.

(10) Patent No.: US 11,855,683 B2
(45) Date of Patent: Dec. 26, 2023

(54) CONFIGURABLE ACQUISITION ENGINE FOR RECEIVER OF SPREAD SPECTRUM SIGNALS

(71) Applicant: Raytheon Company, Waltham, MA (US)

(72) Inventors: Phillip M. Izdebski, El Segundo, CA (US); Gennady Y. Poberezhskiy, El Segundo, CA (US); Matthew C. Dusard, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/845,197

(22) Filed: Jun. 21, 2022

(65) Prior Publication Data

US 2022/0416840 A1 Dec. 29, 2022

Related U.S. Application Data

(60) Provisional application No. 63/216,048, filed on Jun. 29, 2021.

(51) Int. Cl.
*H04B 1/71* (2011.01)
*H04B 1/7093* (2011.01)

(52) U.S. Cl.
CPC ......... *H04B 1/7101* (2013.01); *H04B 1/7093* (2013.01); *H04B 1/7102* (2013.01)

(58) Field of Classification Search
CPC .. H04B 1/7101; H04B 1/7093; H04B 1/7102; H04B 1/70754; H04B 1/709
See application file for complete search history.

(56) References Cited

U.S. PATENT DOCUMENTS

| 6,074,086 | A | * | 6/2000 | Yonge, III | H04L 27/2662 |
| | | | | | 708/422 |
| 6,366,599 | B1 | | 4/2002 | Carlson et al. | |
| 7,447,259 | B2 | | 11/2008 | Betz et al. | |
| 8,106,822 | B2 | | 1/2012 | Schipper et al. | |
| 10,263,721 | B2 | * | 4/2019 | Phillips | H04L 27/2651 |
| 2009/0196377 | A1 | | 8/2009 | Wei et al. | |

FOREIGN PATENT DOCUMENTS

CA    2358931 C * 9/2009    ......... H04L 27/2662

OTHER PUBLICATIONS

International Search Report and Written Opinion dated Nov. 8, 2022, for co-pending International Patent Application No. PCT/US2022/035201.

J. W. Betz, J. D. Fite, and P. T. Capozza, "DirAc: An Integrated Circuit for Direct Acquisition of the M-Code Signal," Proc. ION ITM, Long Beach, CA, Sep. 2004, pp. 447-456.

C. L. Spillard, S. M. Spangenberg, and G. J. R. Povey, "A Serial-Parallel FFT Correlator for PN Code Acquisition from LEO Satellites," Proc. IEEE Intl. Symp. on Spread Spectrum Techniques and Applications, Sun City, South Africa, Sep. 4, 1998, vol. 2, pp. 446-448.

* cited by examiner

*Primary Examiner* — Jean B Corrielus
(74) *Attorney, Agent, or Firm* — Renner, Otto, Boisselle, & Sklar

(57) ABSTRACT

A configurable acquisition engine for direct sequence (DS) spread spectrum (SS) is provided that is reconfigurable without increasing memory size for several use cases having different time-frequency uncertainties. The acquisition engine utilizes a frequency-domain decimation filter to reduce the number of output frequency points while still utilizing information from all frequency bins.

20 Claims, 4 Drawing Sheets

CONFIGURABLE ACQUISITION ENGINE FOR RECEIVER OF SPREAD SPECTRUM SIGNALS

This application claims the benefit of U.S. Provisional Application No. 63/216,048, filed Jun. 29, 2021, which is hereby incorporated by reference in its entirety.

FIELD

The present disclosure relates generally to electronic devices that function as direct sequence spread spectrum receivers and more particularly to reconfigurable electronic devices that function as Global Navigation Satellite System (GNSS) and Regional Navigation Satellite System (RNSS) receivers.

BACKGROUND

Before a direct sequence (DS) spread spectrum (SS) receiver (such as a Global Navigation Satellite System (GNSS) receiver) acquires a DS SS (such as a GNSS) signal, the DS SS receiver is already aware of the position of the DS SS signal on a time-frequency plane with large uncertainties. DS SS receivers include an acquisition engine (AE) subsystem that scans through multiple time-frequency positions to find the DS SS signal position with sufficient accuracy. Standard AE implementation use a fixed-size Fast Fourier Transform (FFT) with subsequent non-coherent integration (NCI) memory with a constant number of time samples and frequency points designed for a worst case scenario (i.e., to ensure that the AE is able to find the DS SS signal position). This brute-force approach (i.e., using a fixed-size FFT with NCI memory for the worst case scenario) increases size, weight, power, and cost (SWaP-C) of the DS SS receiver.

SUMMARY

In a general embodiment, the present disclosure provides a direct sequence (DS) spread spectrum (SS) application-specific integrated circuit (ASIC) configurable for multiple concepts of operation (CONOPs).

Classic DS SS ASIC implementations have fixed coherent integration times and frequency coverage optimized for one CONOP. The present disclosure provides a more flexible integrator by reconfiguring these parameters (i.e., integration times and frequency coverage). Additionally, increasing time coverage and frequency coverage requires a multiplicative growth in memory on the ASIC, which may make the ASIC too large (often resulting in manufacturing yield issues) and/or too expensive. The present disclosure reduces memory growth in the ASIC (e.g., by four times).

The present disclosure creates a topology that can be controlled by software to trade the more strenuous parameters (e.g., time coverage, jamming mitigation, and/or frequency coverage). The present disclosure also implements a unique frequency decimation technique to increase the bin width to double the frequency coverage while maintaining double the time coverage.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure in which similar reference numerals are used to indicate the same or similar parts in the various views.

Figure 1:
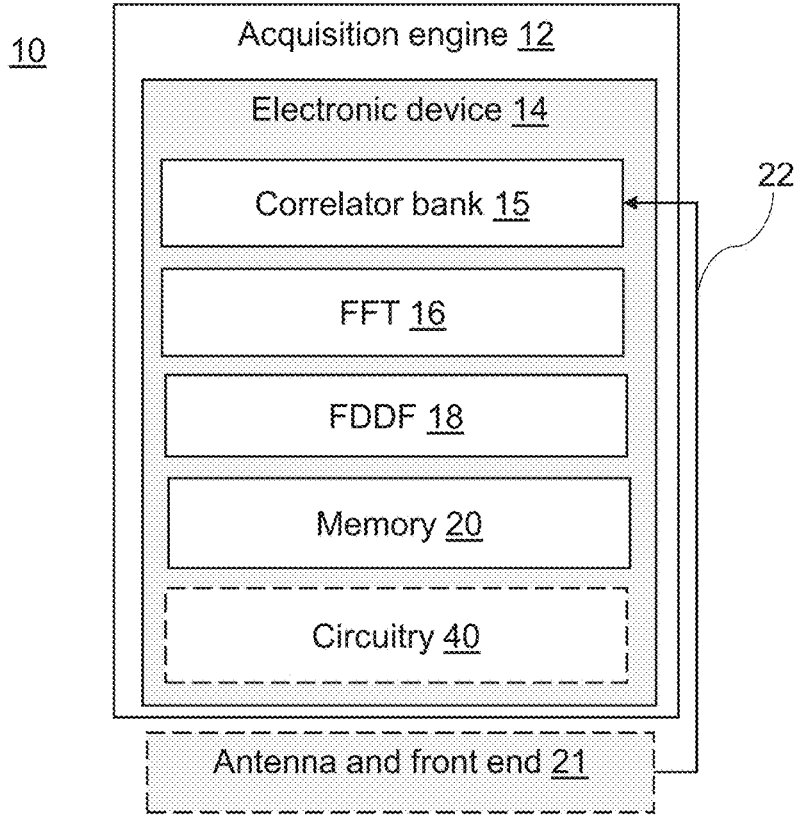
FIG. 1 is a block diagram of an embodiment of a configurable direct sequence (DS) spread spectrum (SS) electronic device.

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a configurable acquisition engine for direct sequence (DS) spread spectrum (SS) receivers (e.g., global navigation satellite systems (GNSS) and regional navigation satellite systems (RNSS) receivers) that is reconfigurable without increasing memory size for several use cases having different time-frequency uncertainties. The acquisition engine utilizes a frequency-domain decimation filter to reduce the number of output frequency points while still utilizing information from all frequency bins.

In a general embodiment, the acquisition engine is flexible to meet current initialization uncertainties and threats and enables configurability for future threats. The acquisition engine may leverage proven characteristics from previous DS SS ASICs while enhancing the design to enable software-controllable parameters to minimize the timeliness acquisition.

In the embodiment shown in FIG. 1, the acquisition engine 12 includes an electronic device 14 having a correlator bank 15, a Fast Fourier Transform (FFT) module 16, a frequency-domain decimation filter (FDDF) 18, and memory 20. The device 14 may be a part of an application-specific integrated circuit (ASIC), a field-programmable gate array (FPGA), and/or a processor (such as a general-purpose processor or graphics processor), to give some non-limiting examples. The FDDF 18 expands the frequency and/or time coverage of the acquisition engine 12 without requiring a comparable increase in memory 20 (e.g., reducing the SWaP-C of the acquisition engine). As shown, the acquisition engine 12 may be included in (may be a part of) a DS SS receiver 10 including an antenna and front end 21.

Figure 2:
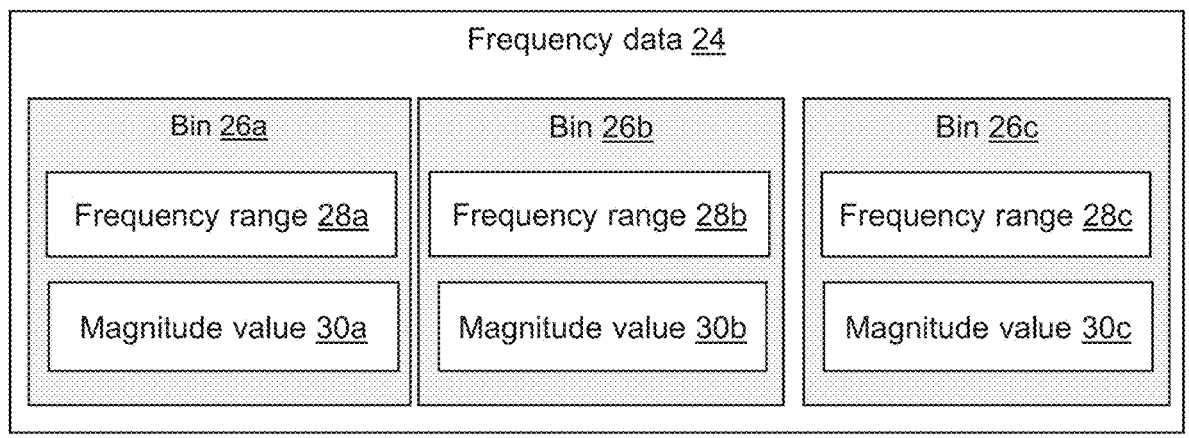
FIG. 2 is a block diagram of an exemplary embodiment of frequency data.

With reference in addition to FIG. 2, the correlator bank 15 receives an input signal 22 (e.g., received by the antenna and front end 21 from a DS SS signal transmitter), correlates it (over pre-determined time interval $T_{corr}$) with reference PN code generated in multiple time positions, and outputs the correlation results for these time positions. The FFT module 16 receives the correlation results from the correlator bank 15 in the form of k subsequent time-domain correlation outputs for each PN code time position. The time interval $T_{CI}=k \cdot T_{corr}$ is called coherent integration time interval. For each PN code time position, the FFT module computes an n-point FFT of the input signal 22, and outputs n bins 26 of frequency data 24. Here, n≥k. If n>k, zero-padding before FFT computation is used. The n bins 26 have an initial frequency spacing and each of the n bins corresponds to a range of frequencies 28 matching the initial frequency spacing. For example, the initial frequency spacing may be 25 Hz and the range of frequencies 28 for one bin may be 25-50 Hz and the range of frequencies 28 for another bin may be 50-75 Hz. Each of the n bins includes a magnitude value 30 based on an amplitude of frequencies of the FFT in the range of frequencies. In FIG. 2, three bins 26a, 26b, 26c are shown with corresponding frequency ranges 28a, 28b, 28c and magnitude values 30a, 30b, 30c. The FFT module 16 may output any number of bins (e.g., 128 bins or 64 bins).

The FDDF 18 utilizes m center bins of frequency data from the FFT module 16 having the initial frequency spacing. The FDDF is used for frequency-domain decimation of the FFT output. The purpose of this decimation is the post-FFT reduction of the number of the output frequency bins in a way that allows optimal utilization of the energy of all FFT bins. Such a reduction is possible and beneficial if the FFT frequency resolution is significantly more accurate than the resolution needed for subsequent pull-in. One benefit of such reduction is the reduced size of the memory 20. If the maximum order of the FDDF is ((n-m)/2)-1, the output transients distort only the unused frequency positions. For example, the FDDF 18 may use half output by the FFT module 16 (e.g., 64 of the 128 bins). The FDDF 18 outputs q bins of frequency data having a larger frequency spacing, wherein q<m. For example, the FDDF 18 may receive sixty-four bins (i.e., m equals sixty-four) and the FDDF 18 may output thirty-two bins of frequency data (i.e., q equals thirty-two).

The FDDF 18 may include any suitable hardware components for reducing the frequency spacing of the bins of frequency data. The frequency-domain decimation filter 18 may be a half-band filter if the decimation is by factor 2.

The memory 20 receives and stores frequency data. For example, the memory 20 may receive frequency data from at least one of the FFT module 16 or the FDDF 18 and store the data. The memory 20 may non-coherently combine subsequent outputs in time from the FFT module 16 and FDDF 18.

The memory 20 may be a computer readable medium such as one or more of a buffer, a flash memory, a hard drive, a removable media, a volatile memory, a non-volatile memory, a random access memory (RAM), or other suitable device. For example, the memory 20 may be RAM used for non-coherent integrations (NCI).

With the addition of a FDDF 18 and reconfigurability of the electronic device 14, the acquisition engine 12 may be configurable to different modes (e.g., three modes) as opposed to the standard single-mode design of a standard of acquisition engine (AE). That is, the electronic device 14 may provide hardware that is reconfigurable through software to support multiple platforms.

Figure 3:
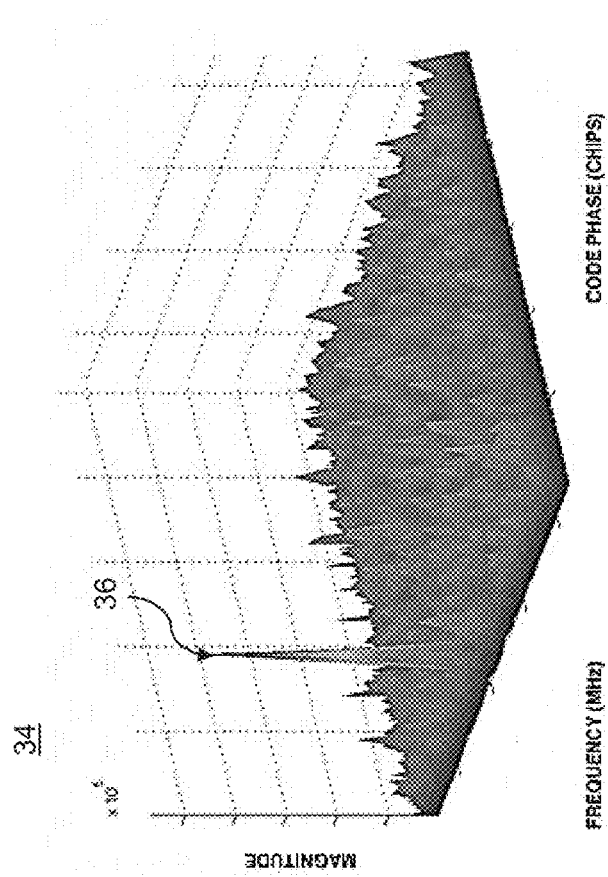
FIG. 3 depicts an exemplary search space.

Turning to FIG. 3 an exemplary search range 34 (also referred to as a search space) is shown. The search range covers a range of frequencies and code time positions. . As shown, the search space 34 of the electronic device 14 includes a frequency search range (also referred to as frequency coverage) and a time search range (also referred to as time coverage). The frequency search range may be defined by a cumulative frequency range of the bins of frequency data received by the memory (e.g., four bins having a 25 Hz spacing resulting in 100 Hz frequency search range). The time search range may be defined by a cumulative time range of the correlators whose outputs are received by the FFT module 16.

The reconfigurability of the acquisition engine 12 enables the search space 34 to be expanded or contracted. This allows the acquisition engine 12 to improve the identification of peaks 36 in the search space 34.

In one embodiment, the electronic device 14 additionally includes circuitry 40. The circuitry 40 receives a mode of operation. For example, a user may select a mode of operation of the acquisition engine via a hardware or software selector. When the mode of operation is a first mode, the circuitry 40 may cause r bins of the n bins of frequency data to be passed from the FFT 16 to the memory 20. The circuitry 40 also causes the memory 20 to store the r bins of frequency data. The r bins of frequency data may have the larger frequency spacing.

When the mode of operation is a second mode, the circuitry 40 may cause s bins of the n bins of frequency data to be passed from the FFT 16 to the memory 20. The circuitry 40 also causes the memory 20 to store the s bins of frequency data. The s bins of frequency data may have the initial frequency spacing and s may be less than r, such that fewer bins of frequency data are stored in the memory 20 in the second mode than in the first mode.

When the mode of operation is a third mode, the circuitry 40 may cause m bins of the n bins of frequency data to be passed from the FFT 16 to FDDF 18. As described above, the FDDF 18 outputs q bins of frequency data that is then stored by the memory 20. In one embodiment, m may be equal to r and q may be less than r, such that fewer bins of frequency data are stored in the memory 20 in the third mode than in the first mode.

In one embodiment, an amount of the memory 20 utilized to store the bins of frequency data in the first mode and the third mode is the same. That is, by altering the frequency spacing and the number of bins of frequency data stored in the memory 20, a same size of memory may be used to store the search range of the first and third modes described above.

Figure 4:
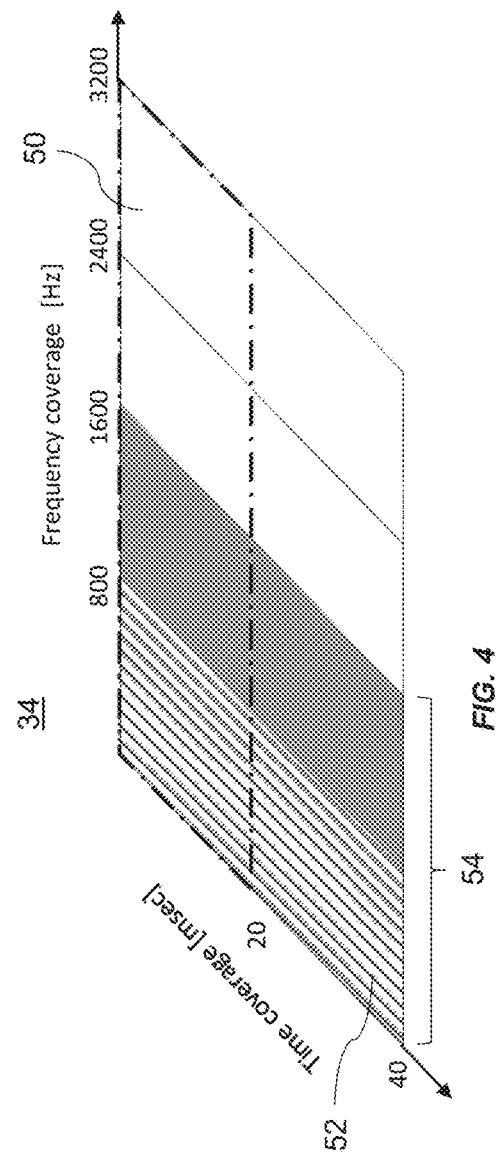
FIG. 4 depicts the search space coverage for an exemplary embodiment of the electronic device.

For example, FIG. 4 shows exemplary differences between frequency and time coverage for exemplary modes of the acquisition engine. In a second mode 52 (shown as the striped region), standard frequency and time coverage is shown. In a first mode 50 (surrounded by a dash-dot line), the frequency coverage is four times larger and the time coverage is half of the standard coverage shown in the first mode 50. In a third mode 54 (shown as a combination of the striped and solid gray region), the frequency coverage is two times the size of the frequency coverage of the first mode 50.

For example, in the embodiment shown in FIG. 4 the larger frequency spacing may be twice as large as the initial frequency spacing and r may be twice as large as both s and q. This results in the frequency coverage of the search space of the electronic device in the first mode being four times the frequency coverage of the search space of the electronic device in the second mode and the time coverage of the search space of the electronic device in the first mode being one half the time coverage of the search space of the electronic device in the second mode. This also results in the frequency coverage of the search space of the electronic device in the third mode being two times the frequency coverage of the search space of the electronic device in the second mode and the time coverage of the search space of the electronic device in the third mode being equal to the time coverage of the search space of the electronic device in the second mode.

Typically, coherent integration time $T_{cI}$ of the acquisition engine is dictated by SNR requirements and as a result, an FFT with 25-Hz bin spacing is used. However, the 25-Hz spacing exceeds the needed frequency granularity and requires large non-coherent integration memory (NCIM). Combining every two bins (50-Hz spacing) maintains the needed frequency granularity while reducing NCIM by half. To avoid information loss, information from all bins is used, but the spacing of the bins is changed to 50-Hz.

Figure 5:
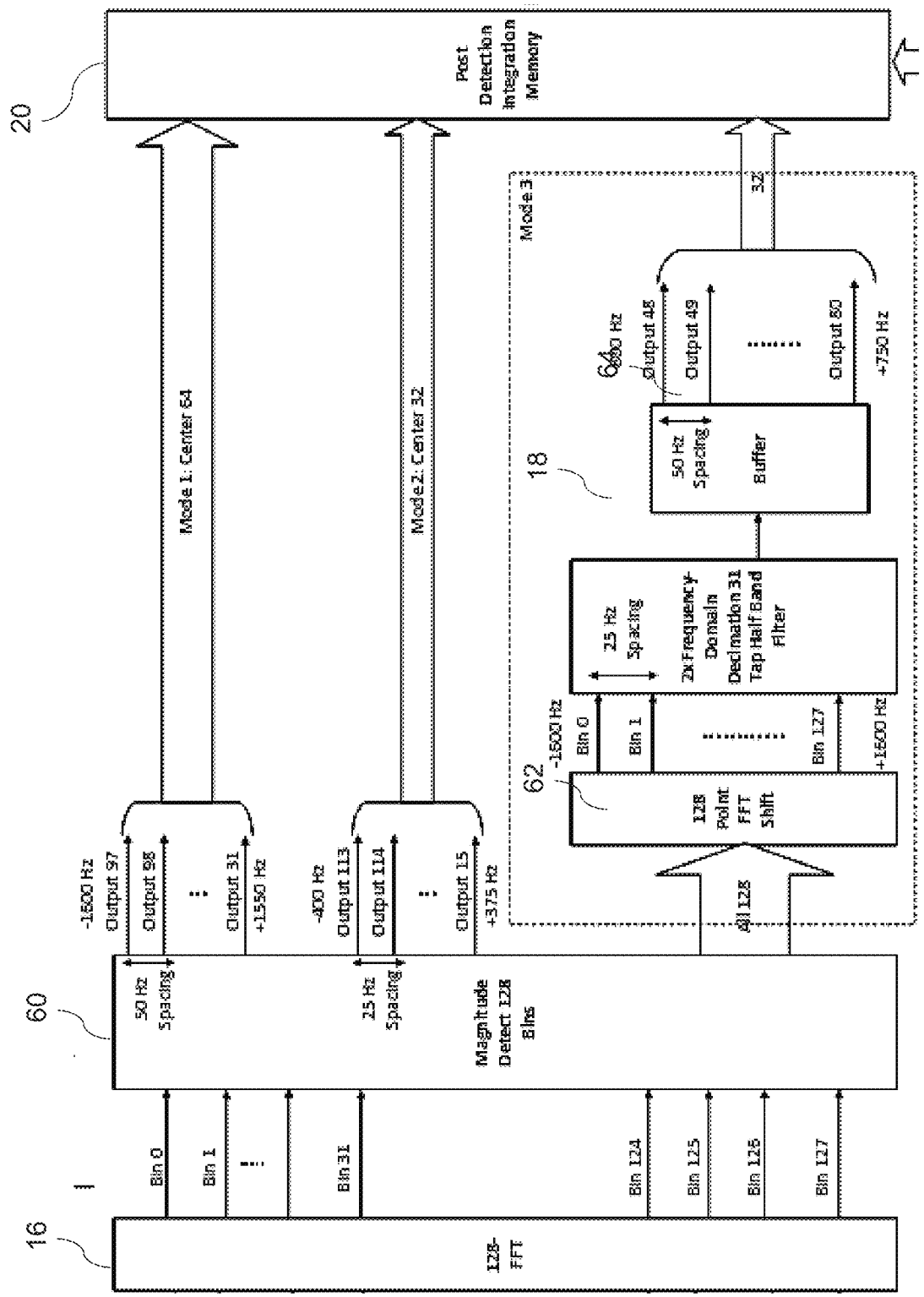
FIG. 5 is a block diagram of an exemplary embodiment of the electronic device of FIG. 1.

In FIG. 5, an exemplary embodiment of the electronic device 14 additionally including a magnitude detector 60, FFT shift 62, and buffer 64 is shown. The FFT 16 receives input from the correlator bank 15 (FIG. 1), as described above. The FFT 16 outputs a number of bins 26 (n bins), where each bin represents a frequency range, and each bin includes a magnitude representing a number of counts for the frequencies represented by the bin. The bins 26 are received by the magnitude detector 60, which outputs the bins. In a first mode, a portion for the n bins output by the magnitude detector 60 are stored in the memory 20. For example, one half of the n bins may be stored in the memory 20. These bins may be selected to have an increased frequency spacing (e.g., 50 Hz as compared to 25 Hz frequency spacing output by FFT). As shown in FIG. 4, the decimation of the bins results in a reduced time coverage (one half in this example), but a fuller frequency coverage.

In the first mode 50, only one half of the bins (e.g., the center 64 bins) may be used, because the unused bins do not have sufficient signal-to-noise ratio (SNR).

In the second mode 52, a smaller number of the n bins output by the magnitude detector 60 are used, but the frequency of the bins is not altered from the initial frequency (e.g., the 25 Hz output of the FFT is maintained). For example, only ¼ of the bins may be used at a frequency of 25 Hz. As shown in FIG. 4, using only a portion of the bins results in a reduced frequency coverage (one quarter of the frequency coverage of the first mode), but maintaining the frequency spacing of the bins also results in an increased time coverage (e.g., two times) compared to the first mode.

In the third mode 54, the bins output by the magnitude detector 60 are combined into a smaller number of m-bins (e.g., m=½ n). The reduced number of m-bins may be formed by frequency-domain decimation of the FFT outputs or their absolute values (e.g. for m=½ n the decimation must be by factor 2). In this way, the number of output frequency points m is reduced compared to the number of bins output by the FFT 16 without discarding useful information. In the third mode, the m-bins may then be received by the buffer 64 before being stored in memory 20. As shown in FIG. 4, the third mode may have twice the frequency coverage of the second mode (one half the frequency coverage of the first mode) and twice the time coverage of the first mode (the same time coverage as the second mode).

Figure 6:
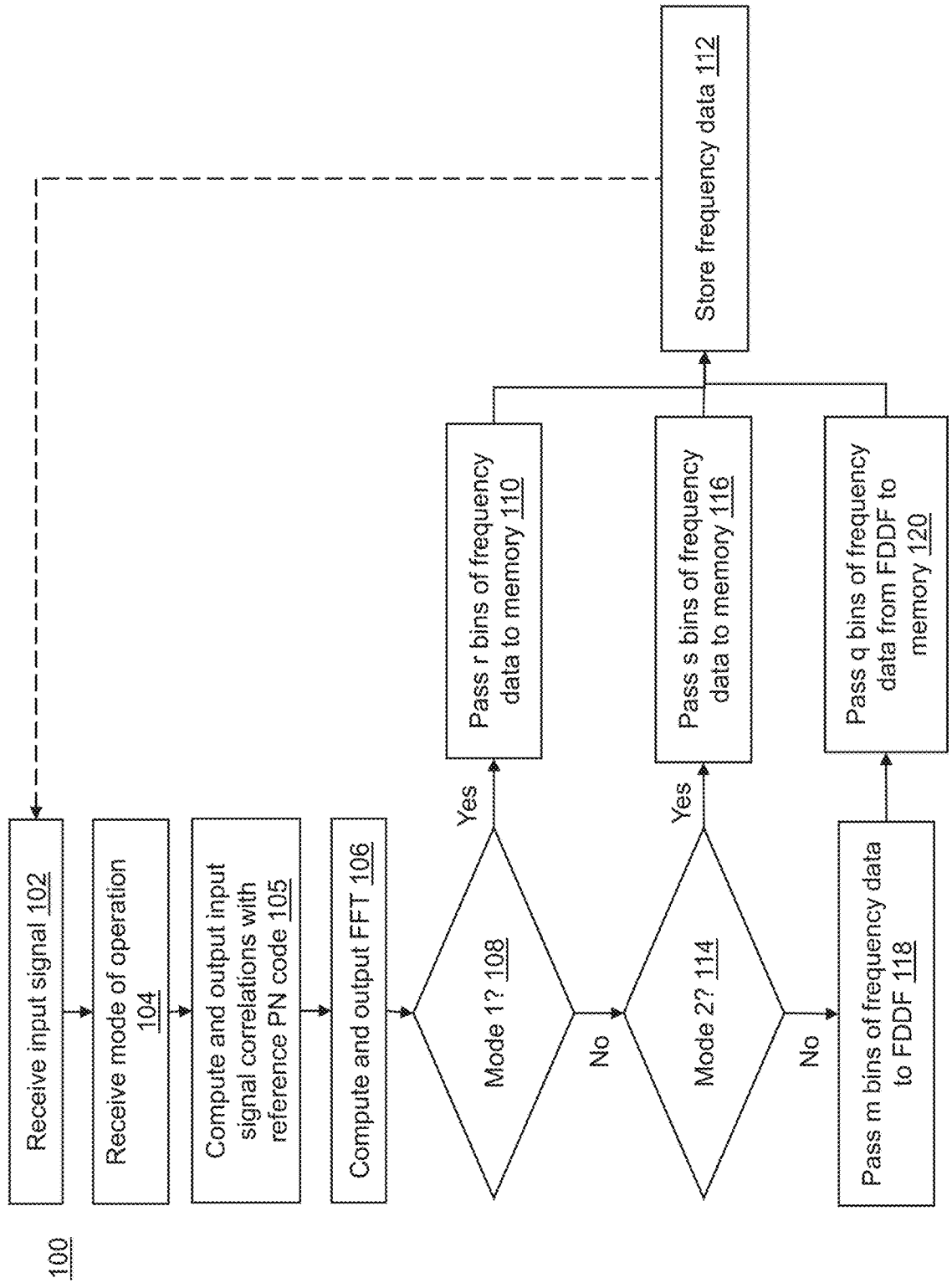
FIG. 6 is a block diagram of an exemplary method of processing an input signal using a configurable DS SS electronic device.

In the embodiment shown in FIG. 6, a method 100 of processing an input signal 22 using a configurable DS SS electronic device is shown. In step 102, the input signal 22 is received. In step 104, the circuitry 40 receives a mode of operation. In step 105, correlation is computed of the input signal 22 with reference PN code in multiple time positions. In step 106, for each PN code time position, an FFT is computed of the k subsequent correlation outputs (zero-padded to n if k<n) using the FFT module 16 and n bins of frequency data having an initial frequency spacing are output. In step 108, a check is performed to determine if a first mode of operation was received in step 104. If yes, then processing moves to step 110. In step 110, r bins of the n bins of frequency data are passed from the FFT 16 to the memory 20. In step 112, the r bins of frequency data are stored in memory 20.

When the received mode of operation is not a first mode in step 108, then processing moves to step 114. In step 114, a check is performed to determine if a second mode of operation was received in step 104. If yes, then processing moves to step 116. In step 116, s bins of the n bins of frequency data are passed from the FFT 16 to the memory 20 and are stored in step 112.

When the received mode of operation is not a second mode in step 114, then processing moves to step 118. In step 118, the FDDF 18 receives m bins of frequency data from the FFT module 16. In step 120, q bins of frequency data having a larger frequency spacing are passed from the FDDF to the memory 20 and are stored in step 112.

Optionally following step 112, processing may return to step 102 and another input signal 102 may be received.

In one embodiment, the acquisition engine may have three modes of operation. Mode 1 may be used, for example, in Anti-Jam (AJ) GNSS receivers where the signal-to-noise ratio (SNR) is expected to be high but there is a need for expanded frequency coverage to accommodate high dynamics. Mode 2 may be used, for example, in GNSS receivers with smaller uncertainties but reduced AJ capability where SNR may be low. Mode 3 may be used, for example, for handheld GNSS receivers where there is a need to accommodate low-cost oscillators (i.e. high frequency uncertainty) and potentially low SNR.

The circuitry 40 may have various implementations. For example, the circuitry 40 may include any suitable device, such as a processor (e.g., CPU), programmable circuit, integrated circuit, non-volatile memory and I/O circuits, an application specific integrated circuit, microcontroller, complex programmable logic device, other programmable circuits, or the like. The circuitry 40 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 40. The circuitry 40 may be communicatively coupled to the computer readable medium and network interface through a system bus, mother board, or using any other suitable structure known in the art.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

The invention claimed is:

1. A configurable direct sequence (DS) spread spectrum (SS) electronic device including:
   a fast Fourier transform (FFT) module configured to:
      receive an input signal;
      compute an FFT of the input signal;
      output n bins of frequency data having an initial frequency spacing, wherein n is an integer greater than 1, and wherein each of the n bins:
         corresponds to a range of frequencies matching the initial frequency spacing; and
         includes a magnitude of a complex-valued FFT output for the bin;
   a frequency-domain decimation filter configured to:
      utilize m bins of the n bins of frequency data from the FFT module having the initial frequency spacing, wherein m is an integer greater than 1; and
      output q bins of the n bins of frequency data having a larger frequency spacing, wherein q is an integer greater than 1, and wherein q<m; and
   memory configured to receive and store a portion of the n bins of frequency data.

2. The configurable DSSS electronic device of claim 1, further comprising circuitry configured to:
   receive a mode of operation;
   when the mode of operation is a first mode:
      pass r bins of the n bins of frequency data from the FFT to the memory, wherein r is an integer greater than 1; and
      cause the memory to store the r bins of frequency data as said portion;
   when the mode of operation is a second mode:
      pass s bins of the n bins of frequency data from the FFT to the memory, wherein s is an integer greater than 1, and wherein s is less than r; and
      cause the memory to store the s bins of frequency data as said portion; and
   when the mode of operation is a third mode:
      pass the m bins of the n bins of frequency data from the FFT to the frequency-domain decimation filter; and
      cause the memory to store the q bins of frequency data as said portion.

3. The configurable DSSS electronic device of claim 2, wherein the r bins of frequency data have the larger frequency spacing and the s bins of frequency data have the initial frequency spacing.

4. The configurable DSSS electronic device of claim 3, wherein a search space of the electronic device includes:
   a frequency search range defined by a cumulative frequency range of the bins of frequency data received by the memory; and
   a time search range defined by a cumulative time range of correlators whose outputs are received by the FFT module from a correlator bank of the electronic device.

5. The configurable DSSS electronic device of claim 4, wherein an amount of the memory utilized to store the bins of frequency data in the first mode and the third mode is the same.

6. The configurable DSSS electronic device of claim 5, wherein:
   the larger frequency spacing is twice as large as the initial frequency spacing;
   r is twice as large as both s and q;
   the frequency search range of the electronic device in the first mode is four times the frequency search range of the electronic device in the second mode;
   the time search range of the electronic device in the first mode is one half the time search range of the electronic device in the second mode;
   the frequency search range of the electronic device in the third mode is two times the frequency search range of the electronic device in the second mode; and
   the time search range of the electronic device in the third mode is equal to the time search range of the electronic device in the second mode.

7. The configurable DSSS electronic device of claim 1, wherein the frequency-domain decimation filter is a half-band filter and the decimation is by factor 2.

8. The configurable DSSS electronic device of claim 1, wherein the memory non-coherently combines subsequent outputs from the FFT module or the frequency-domain decimation filter.

9. A configurable direct sequence (DS) spread spectrum (SS) electronic device including:
   a fast Fourier transform (FFT) module configured to:
      receive an input signal;
      compute an FFT of the input signal;
      output n bins of frequency data having an initial frequency spacing, wherein n is an integer greater than 1, and wherein each of the n bins:
         corresponds to a range of frequencies matching the initial frequency spacing; and
         includes a magnitude value based on an amplitude of frequencies of the FFT in the range of frequencies;
   memory configured to receive and store a portion of the n bins of frequency data; and
   circuitry configured to:
      receive a mode of operation;
      when the mode of operation is a first mode:
         pass r bins of the n bins of frequency data from the FFT to the memory, wherein r is an integer greater than 1; and
         cause the memory to store the r bins of frequency data as said portion;
      when the mode of operation is a second mode:
         pass s bins of the n bins of frequency data from the FFT to the memory, wherein s is an integer greater than 1, and wherein s is less than r; and
         cause the memory to store the s bins of frequency data as said portion; and
      when the mode of operation is a third mode:
         pass the m bins of the n bins of frequency data from the FFT to a frequency-domain decimation filter, wherein m is an integer greater than 1; and cause the memory to store q bins of the n bins of frequency data as said portion, wherein q is an integer greater than 1.

10. The electronic device of claim 9, wherein:
the n bins of frequency data have an initial frequency spacing;
the r bins of frequency data and the q bins of frequency data have a larger frequency spacing; and
the s bins of the n bins of frequency data have the initial frequency spacing.

11. The electronic device of claim 10, wherein a search space of the electronic device includes:
a frequency search range defined by a cumulative frequency range of the bins of frequency data received by the memory; and
a time search range defined by a cumulative time range of correlators whose outputs are received by the FFT module from a correlator bank of the electronic device.

12. The electronic device of claim 11, wherein an amount of the memory utilized to store the bins of frequency data in the first mode and the third mode is the same.

13. The electronic device of claim 12, wherein:
the larger frequency spacing is twice as large as the initial frequency spacing;
r is twice as large as both s and q;
the frequency search range of the electronic device in the first mode is four times the frequency search range of the electronic device in the second mode;
the time search range of the electronic device in the first mode is one half the time search range of the electronic device in the second mode;
the frequency search range of the electronic device in the third mode is two times the frequency search range of the electronic device in the second mode; and
the time search range of the electronic device in the third mode is equal to the time search range of the electronic device in the second mode.

14. The electronic device of claim 9, wherein the frequency-domain decimation filter is configured to:
utilize the m bins of frequency data from the FFT module having the initial frequency spacing; and
output q bins of frequency data having a larger frequency spacing, wherein q is an integer greater than 1, and wherein q<m.

15. The electronic device of claim 14, wherein the frequency-domain decimation filter is a half-band filter and the frequency-domain decimation is by factor 2.

16. A method of processing an input signal using a configurable direct sequence (DS) spread spectrum (SS) electronic device, the method comprising:
receiving the input signal;
correlating the input signal to produce a correlated input signal;
computing a fast Fourier transform (FFT) of the correlated input signal using an FFT module;
outputting from the FFT module n bins of frequency data having an initial frequency spacing, wherein n is an integer greater than 1, and wherein each of the n bins:
corresponds to a range of frequencies matching the initial frequency spacing; and
includes a magnitude value based on an amplitude of frequencies of the FFT in the range of frequencies;
receiving with a frequency-domain decimation filter m bins of the n bins of frequency data from the FFT module having the initial frequency spacing, wherein m is an integer greater than 1;
outputting from the frequency-domain decimation filter q bins of frequency data having a larger frequency spacing, wherein q is an integer greater than 1, and wherein q<m; and
storing a portion of the n bins of frequency data in memory.

17. The method of claim 16, further comprising:
receiving with circuitry a mode of operation;
when the mode of operation is a first mode:
passing r bins of the n bins of frequency data from the FFT to the memory, wherein r is an integer greater than 1; and
storing in the memory the r bins of frequency data as said portion;
when the mode of operation is a second mode:
passing s bins of the n bins of frequency data from the FFT to the memory, wherein s is an integer greater than 1, and wherein s is less than r; and
storing in the memory the s bins of frequency data as said portion; and
when the mode of operation is a third mode:
passing the m bins of the n bins of frequency data from the FFT to the frequency-domain decimation filter; and
storing in the memory the q bins of frequency data as said portion.

18. The method of claim 17, wherein:
the r bins of frequency data have the larger frequency spacing and the s bins of frequency data have the initial frequency spacing; and
a search space of the electronic device includes:
a frequency search range defined by a cumulative frequency range of the bins of frequency data received by the memory; and
a time search range defined by a cumulative time range of correlators whose outputs are received by the FFT module from a correlator bank of the electronic device.

19. The method of claim 18, wherein an amount of the memory utilized to store the bins of frequency data in the first mode and the third mode is the same.

20. The method of claim 19, wherein:
the larger frequency spacing is twice as large as the initial frequency spacing;
r is twice as large as both s and q;
the frequency search range of the search space in the first mode is four times the frequency search range of the search space in the second mode;
the time search range of the search space in the first mode is one half the time search range of the search space in the second mode;
the frequency search range of the search space in the third mode is two times the frequency search range of the search space in the second mode; and
the time search range of the search space in the third mode is equal to the time search range of the search space in the second mode.

* * * * *